United States Patent Office 3,471,437
Patented Oct. 7, 1969

3,471,437
HIGH STRENGTH RESIN SYSTEM AND METHODS OF MAKING AND APPLYING THE SAME
James N. Hume, Jr., Powell, Ohio (% Hume Corp., 3051 Lamb Ave., Columbus, Ohio 43219)
No Drawing. Filed June 1, 1966, Ser. No. 554,313
Int. Cl. C08f 45/10, 45/04, 43/02
U.S. Cl. 260—40     9 Claims

ABSTRACT OF THE DISCLOSURE

A sprayable coating composition consists of a liquid resin system incorporating a reinforcing mixture of glass platelets and glass fibers, the platelets having a maximum diameter of about one-eighth inch and a thickness of from about 2 to about 6 microns, the platelets being present in an amount of from about 5 percent to about 40 percent and the fibers being present in an amount of from about 2 percent to about 12 percent by weight of the coating composition.

---

This invention relates generally to resinous compositions for coating and structural utilization and more particularly to such compositions that are applied as a pressurized stream directed through a nozzle.

Spray-applied compositions frequently incorporate an inert, non-resinous filler to enhance the strength and effectiveness of the cured coating; and short glass fibers are commonly employed as such a filler. In practice, glass roving or glass fabric is chopped into short fibers at the dispensing nozzle to be mixed into a catalyzed resin issuing therefrom. Heretofore, it has been impossible to mix the fibers into the resin any appreciable time before actual application because the fibers do not form a stable dispersion and quickly settle out of the liquid resin. In addition, the fibers tend to collect in the vicinity of any irregularity in a flow passageway through which the mixture may be directed. In addition, difficulties have arisen as a result of the chopped fibers being only partially wet by the resin. In this latter instance, the cured composition exhibits porosity and is thereby capable of "wicking" a corrosive fluid into contact with a substrate that has received the coating. Furthermore, resinous coatings reinforced exclusively by glass fibers have an undesirably high degree of shrinkage upon curing, 4–6% shrinkage being common. This shrinkage causes the coating to separate from the receiving substrate, weakening the unit structurally and exposing large surfaces of the substrate to corrosion whenever the void or gap resulting from the shrinkage communicates through the coating by a pinhole.

An important object of the present invention is therefore to provide a coating composition in which reinforcing fibers form a stable dispersion in a liquid resin.

Another object of the invention is to provide a pre-mixed coating composition that is stable upon storage and that is capable of being sprayed.

Still another object of the invention is to provide a fiber-reinforced coating that exhibits tenacious and persistent bonding to a receiving subtrate.

And still another object of the invention is to provide a fiber-reinforced coating composition that exhibits a volumetric shrinkage on cure of no more than about 1%.

Yet another object of the invention is to provide a fiber-reinforced coating that is itself strong enough structurally to rejuvenate a worn or corroded substrate.

And yet another object of the invention is to provide a fiber-reinforced coating that possesses high tensile strength.

A further object of the invention is to provide a new and improved reinforcing system for reactable resins.

A yet further object of the invention is to provide a novel coated article.

And a yet further object of the invention is to provide a method of applying an improved coating of the reinforced type.

The objects of the invention are achieved by incorporating comparatively generous amounts of both multi-filament glass fibers and minute glass platelets in a liquid resin that is reactable to form a solid layer upon the addition of a suitable catalyst.

Whereas the fibers and platelets used in the invention are referred to herein as being made of glass, the type of glass is comparatively unimportant to the invention. Fibers and platelets of glass are utilized because of their inertness, strength and wettability by various liquid resins; and the term "glass" is used herein to mean any material having sufficient strength, inertness and wettability for the purposes of the invention.

Incorporation of glass fibers in the composition of the invention has been found to promote high tensile strength in the cured coating, and maximum strength has been developed when these fibers are multi-filament in character. Suitable fibers may be obtained by cutting glass fiber roving or fabric to mean fiber lengths of from 1/16 to about 3/4 of an inch, the longer fibers promoting optimum tensile strength in the cured coating. It has been found that even fibers having a mean length of 3/4 of an inch may be made to form a stable suspension in accord with the principles of the invention. Glass fibers having as many as 200 filaments or more per fiber have been advantageously employed in the practice of the invention; and in accord with the principles of the invention, the coating composition is selected to contain from about 2 to about 12% by weight of glass fibers.

Incorporation of glass platelets in the composition of the invention has been found to promote a stable dispersion of the glass fibers. The glass platelets also cooperate with the glass fibers in forming a rigid skeletal network in the cured coating which network lends maximum available strength to the cured coating and which minimizes shrinkage of the coating composition during its curing. The glass platelets incorporated in the composition are selected to have a maximum diameter of about 1/8-inch; and desirably, less than 10% of the platelets are under 200-mesh in screen size. The glass platelets which are to be used in the invention are selected to have a thickness of from about 2 to about 6 microns, and it has been found that the cured coating tends to lose flexibility when platelets thicker than about 6 microns are used. The glass platelets have a random shape and are present in the composition in an amount of from about 5% to about 40% by weight. It is theorized that, because of the large surface area of the individual platelets and their compartitively small weight, substantial suspending force resulting from surface tension is present when the platelets are thoroughly wet by the resinous system in which they are dispersed. It is also theorized that the comparatively immobilized platelets form an internal matrix within the liquid resin system which serves to hold the glass fibers in suspension, preventing them from settling out and additionally sweeping the glass fibers along when the coating composition is being transferred, as for example from a storage tank to a spray nozzle for application.

In further accord with the invention, both the glass fibers and the glass platelets are thoroughly wet with the liquid resin into which they are mixed. Specific procedures for securing a truly liquid-wet condition of the fibers and platelets will be set forth hereinafter.

In further accord with the features of the invention, the weight ratio of platelets to fibers is selected to be about 2:1. Maintaining this relationship has been found to minimize curing stresses and to hold the shrinkage during cure to a maximum of 1% by volume.

The resin system employed in the coating system of the invention is selected to be liquid and reactable to form a solid layer upon the addition of a suitable catalyst; and various resins may be employed, including polyester resins, epoxy resins and resinous systems including urethanes or polyurethanes. Thermosetting resins made from unsaturated polyesters and cured by cross-linking are preferred. Polyesters suitable for use in the invention may be made by conventional methods, for example methods involving direct esterification or an ester interchange; and suitable reactants include polyols, such as the various available glycols and 4,4'-isopropylidenediphenol, and both aliphatic and aromatic dicarboxylic acids, such as maleic, fumaric and terephthalic acids.

It has been found that various amendments may be included in the resin system without altering the properties of the coating composition. Such common amendments as diluents, promoters, thixotropic agents and pigments have been employed in this regard.

In order to describe the invention more fully, the following specific example is given without, however, limiting the invention to the precise details and conditions set forth.

EXAMPLE I

| | Parts by weight |
|---|---|
| Atlac 382 (Bisphenol A modified polyester resin) | 70 |
| Glass fibers (201 filaments/fiber) | 10 |
| Glass platelets | 20 |

In order to prepare a coating composition from the foregoing ingredients, the polyester resin was introduced into a vacuum tank and held for a minimum period of 30 minutes under a vacuum of 27 inches of mercury in order to accomplish degasing. If the resin system for the coating were to have included other components, such as for example a styrene diluent, the components of the resin system would have been introduced into a high sheer dispersion type mixer to achieve substantially homogeneous dispersion before degasing. The degased resin system was transferred to a Simpson mix muller of the vacuum type, and the glass platelets were added. This mixture was agitated for 30 minutes under a vacuum of 27 inches of mercury whereupon the muller was opened and glass fibers added. The muller was then closed and operated for 5 minutes under a vacuum of 27 inches of mercury. The different mixing times have been found to achieve thorough wetting of the glass platelets and glass fibers respectively. Moreover, minimal mixing after the glass fibers have been introduced is desirable in order to preserve the multi-filament character of the fibers. Upon completion of mixing in the vacuum muller, the material was placed in 30-gallon steel drums having a phenolic lining.

The coating composition of Example I was variously applied to such substrates as the walls of metal tanks for providing a corrosion resistant lining and to the surface of the soil for establishing a solid paving surface. The coating composition was applied by using a 10:1 ratio pneumatically operated pump to force the composition through a spray gun of the type which atomizes the liquid composition while injecting catalyst into the atomized stream. During operation of the equipment, no blockages in the flow of liquid were noted, as might be expected upon attempting to spray an ordinary reinforced resin composition. The finished coatings exhibited tensile strengths of approximately 10,000 p.s.i. and, in the case of metal substrates, no delamination was detected after curing of the coating. Volumetric shrinkage upon curing was found to be less than 1%.

In accordance with a further feature of the invention, when the composition is applied to metal substrates, the exposed surface of the coating is advantageously treated with a roller while the coating composition is in an incipiently curing state. The rolling of the surface of the composition is caused to take place in a plane generally parallel to that of the substrate, moderate pressure being applied to the coating composition in conjunction with the rolling. The described procedure promotes maxmium physical properties in the cured coating, as a result, it is theorized, of orienting the glass platelets generally parallel to the plane of the substrate.

The specific procedures and examples herein described are to be considered as being primarily illustrative. Various changes will, no doubt, occur to those skilled in this art; and such departures are to be understood as forming a part of this invention insofar as they fall within the spirit and scope of the appended claims.

The invention is claimed as follows:

1. A sprayable coating composition consisting essentially of: a liquid resin system retractable to form a solid layer upon the addition of catalyst; and a reinforcing system for said resin system consisting essentially of glass platelets and glass fibers, said platelets having a maximum diameter of about ⅛-inch and a thickness of from about 2 to about 6 microns, said fibers having a mean fiber length of from about 1/16 to about ¾ of an inch, said platelets and said fibers being thoroughly liquid-wet, said platelets being present in an amount of from about 5% to about 40% and said fibers being present in an amount of from about 2% to about 12% by weight of said coating composition.

2. A coating composition according to claim 1 wherein the weight ratio of platelets to fibers is about 2:1.

3. A coating composition according to claim 1 wherein said fibers have a mean length of about ¾-inch.

4. A coating composition according to claim 1 wherein said glass fibers are multi-filament fibers.

5. A coating composition according to claim 1 wherein said resin system includes a polyester.

6. A coated article composing a substrate and, as a coating on said substrate, the cured composition of claim 1.

7. A reinforcing filler for a reactable resin consisting essentially of glass platelets and glass fibers, said platelets having a maximum diameter of about ⅛-inch and a thickness of from about 2 to about 6 microns, said fibers having a mean fiber length of from about 1/16 to about ¾ of an inch, the weight ratio of platelets to fibers being about 2:1.

8. A filler according to claim 7 wherein said fibers have a mean length of about ¾-inch.

9. A filler according to claim 7 wherein said glass fibers are multi-filament fibers.

References Cited

UNITED STATES PATENTS

| 2,863,783 | 12/1958 | Greenstein | 260— 40 X |
| 2,981,980 | 5/1961 | Brown et al. | |
| 2,991,293 | 7/1961 | Batzer et al. | 260—37 X |
| 3,009,824 | 11/1961 | Boynton et al. | 117—97 X |
| 3,017,381 | 1/1962 | Schlegel | 260—40 X |
| 3,297,635 | 1/1967 | Bergman et al. | 260—37 X |

FOREIGN PATENTS

| 722,628 | 1/1955 | Great Britain. |

WILLIAM D. MARTIN, Primary Examiner

M. LUSIGNAN, Assistant Examiner

U.S. Cl. X.R.

1—132, 165; 117—2, 97, 161; 161—162, 170; 260—37